UNITED STATES PATENT OFFICE.

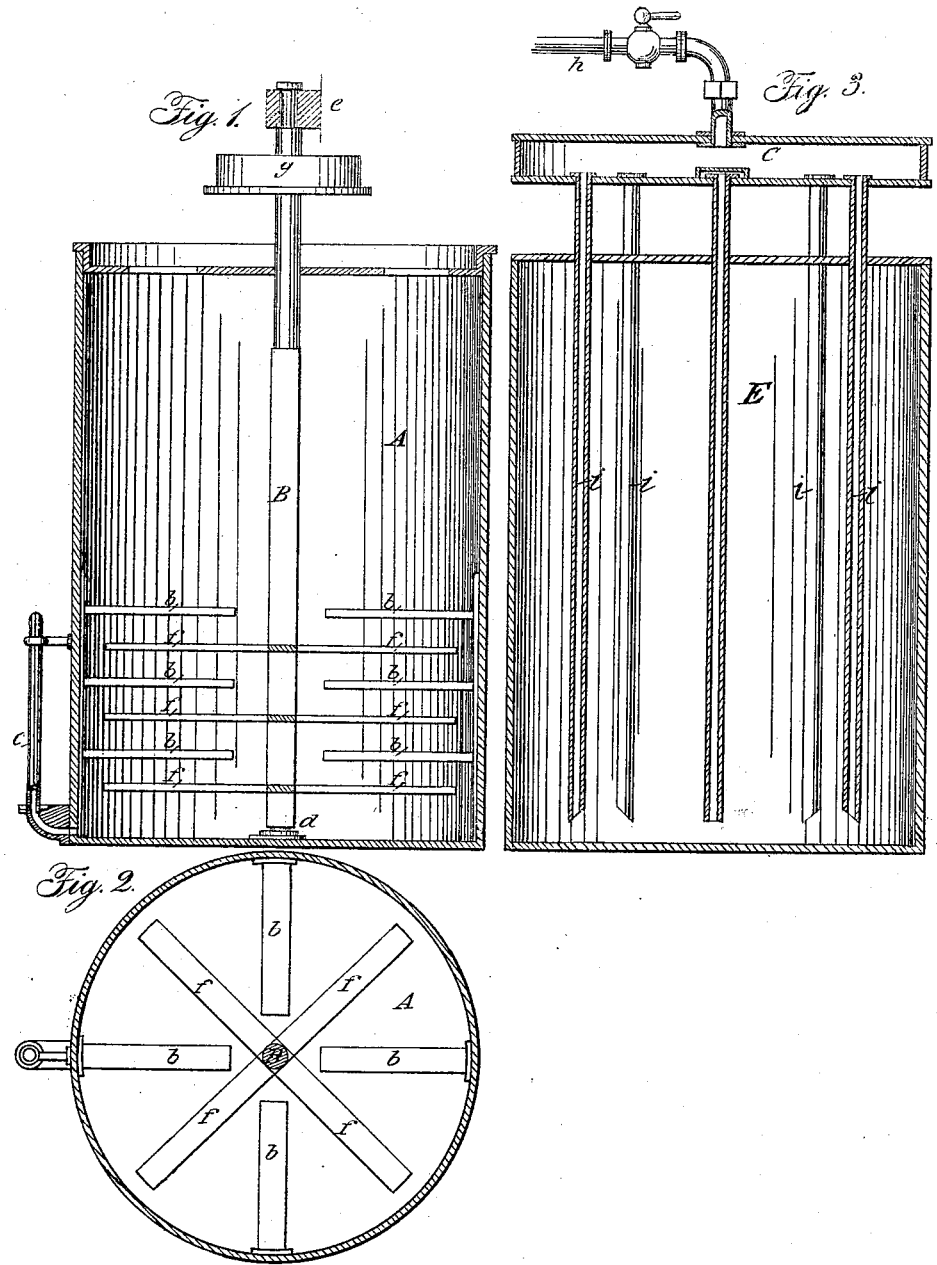

E. T. DE GEMINI AND E. O. DE GEMINI, OF PARIS, FRANCE.

IMPROVEMENT IN CLARIFYING SACCHARINE JUICES.

Specification forming part of Letters Patent No. 37,614, dated February 10, 1863.

*To all whom it may concern:*

Be it known that we, EDOUARD THÉOPHILE DE GEMINI and EDMOND OSWALD DE GEMINI, of Paris, in the Empire of France, chemists, have invented a new Process of Bleaching and Clarifying Saccharine Juices; and we do hereby declare that the following is a full, clear, and exact description of the same, reference being had to the accompanying drawings, forming part of this specification.

Our invention consists in the treatment of saccharine juices with fuller's earth or clay and powdered bone-black by introducing the said substances into the juices and subjecting them to agitation, produced either by means of stirrers or mechanical agitators or by the introduction of jets of steam, or by both of these means combined.

The apparatus employed in carrying out our invention may be varied. We have represented examples of an apparatus for effecting the process by the aid of stirrers or mechanical agitators, and of one for effecting it by the aid of agitation produced by jets of steam.

Figure 1 is a vertical section of the first-named apparatus, and Fig. 2 is a horizontal section of the same. Fig. 3 is a vertical section of the second apparatus.

In Figs. 1 and 2, A is an upright vessel for the reception of the juices to be treated, having attached to its sides a number of radially-arranged fixed blades or paddles, *b b*, and having applied to it a thermometer, *c*, to indicate the temperature of the contained juices.

B is an upright shaft working in a step-bearing, *d*, at the bottom of the vessel, and in a guide-bearing, *e*, above the vessel. This shaft carries a number of paddles or stirrers, *f f*, arranged to rotate between the stationary blades or paddles *b b*, and is furnished with a pulley, *g*, or other equivalent means of receiving the rotary motion by which the paddles or stirrers *f f* are made to produce the agitation of the sirup or juice.

In Fig. 3, E is the vessel for the reception of the juices. *h* is the pipe for supplying steam from a boiler to the distributing-box C, which is arranged above the vessel A, and from which a number of tubes, *i i*, lead into and nearly to the bottom of the vessel for the introduction of the steam thereunto.

We will describe the process first with reference to Figs. 1 and 2. To a given quantity of juice conveyed to the vessel A from the press we add from one to two per cent., by weight, of finely-powdered bone-black, a similar proportion of fuller's earth or clay, and a similar proportion of milk of lime of a density of from 10° to 14° Baumé, and impart to shaft B and its attached paddles or stirrers a rotary motion at a velocity of from one to one thousand or more revolutions per minute, and in about from five to ten minutes the sirup is defecated, bleached, and clarified. If agitation by jets of steam be used in combination with the agitation by machinery, as above described, the pipes for the introduction of the jets must enter the vessel A at the bottom or sides, where they will not be interfered with by the rotary paddles or stirrers.

The juice, instead of being treated in a cold state, as it comes from the press, may be heated by a closed coil of steam-pipe arranged within the vessel A.

When the apparatus shown in Fig. 3 is used, the juice may be defecated in the usual manner and by the usual apparatus before its introduction to the vessel A. In this vessel it has added to it from one to two per cent. of finely-powdered bone-black and a similar proportion of fuller's earth or clay, and steam is admitted among it through the tubes *i i*, to produce a violent agitation resembling ebullition, which, being continued for about from ten to fifteen minutes, causes the bleaching and clarifying process to be completely effected.

For bleaching brown or coarse sugar we may use either of the apparatuses above described or perform the process in the ordinary defecating apparatus by simply throwing into the sirup three to four per cent., by weight, of finely-powdered bone-black, with a like proportion of fuller's earth or clay and the quantity of blood commonly used.

Our improved process obviates the necessity for the use of granulated bone-black and greatly simplifies the manufacture of sugar.

What we claim as our invention, and desire to secure by Letters Patent, is—

1. The method of clarifying saccharine juices herein shown and described, which consists in subjecting them to the simultaneous action of molecular agitation, water, steam, animal charcoal, and fuller's earth, substantially in the manner set forth.

2. The employment of the apparatus herein shown and described, for the purpose set forth.

E. T. DE GEMINI.
     E. O. DE GEMINI.

Witnesses:
 A. GUION, Jr.,
 GEO. HUTTON.